Jan. 22, 1924.
E. J. WIRFS
GASKET
Filed Nov. 28, 1921
1,481,451
Fig. I.
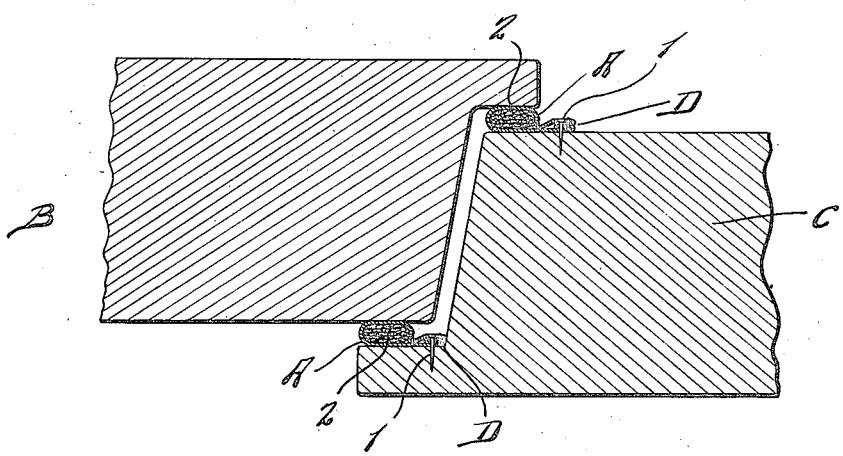
Fig. II.
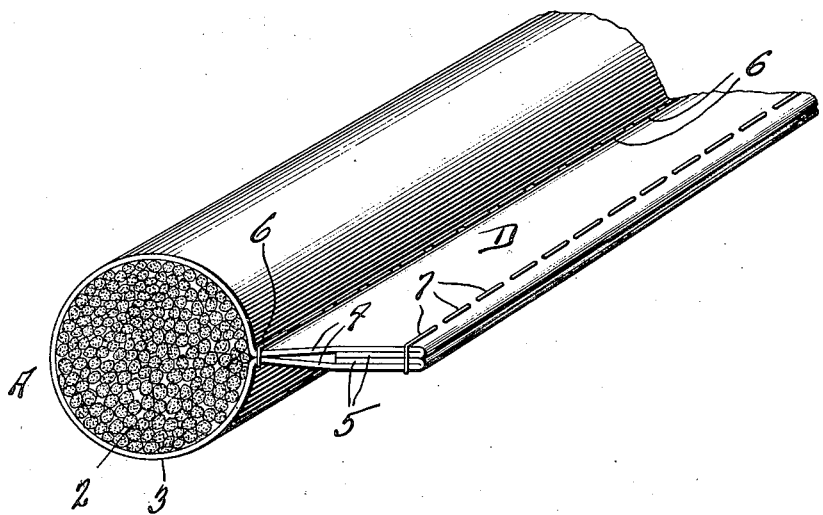
Inventor
Edward J. Wirfs
by Cook & McCauley   Attys.

Patented Jan. 22, 1924.

1,481,451

UNITED STATES PATENT OFFICE.

EDWARD J. WIRFS, OF WEBSTER GROVES, MISSOURI.

GASKET.

Application filed November 28, 1921. Serial No. 518,221.

*To all whom it may concern:*

Be it known that I, EDWARD J. WIRFS, a citizen of the United States of America, a resident of Webster Groves, in the county of St. Louis and State of Missouri, have invented certain new and useful Improvements in Gaskets, of which the following is a full, clear, and exact description, reference being had to the accompanying drawings, forming a part of this specification.

This invention relates to improvements in gaskets adapted for use as packing around refrigerator doors, although it is to be understood that the new gasket could be used as a packing strip to form a seal between various other objects.

The main object of the invention is to produce a strong, simple and inexpensive flexible gasket having a neat appearance and provided with an enclosed packing element and a strong attaching flange extending from one side of the packing element.

Fig. I is a section showing two of the gaskets between a door and a wall of a refrigerator.

Fig. II is an enlarged perspective view showing an end portion of an elongated gasket embodying the features of this invention.

To illustrate one of the uses of the new gaskets, I have shown a portion of a refrigerator equipped with gaskets A. A portion of a refrigerator door is shown at B, and C designates a portion of a refrigerator wall, the gaskets being between the door and wall. Each gasket is provided with a longitudinal attaching flange D adapted to receive tacks 1, or other suitable attaching devices, which may be driven through the flange and into the object to which the gasket is applied.

The prefered form of the invention comprises an elongated body of yielding packing 2, which may be made of soft fibrous cord, the body of packing being primarily circular in cross section, as shown in Fig. II, and it can be compressed or flattened as shown in Fig. I. This packing will freely yield to form an effective seal, and when the pressure is relieved it will tend to return to the substantially circular shape shown in Fig. II.

The gasket includes a strip of flexible, pliable material, preferably waterproof fabric, having an enclosing middle portion 3 surrounding the elongated body of packing, intermediate portions 4 extending from one side of the packing, and marginal portions 5 folded backwardly and interposed between said intermediate portions. In the preferred form of the invention, the interposed marginal portions 5 are in contact with each other and also in contact with the inner faces of the intermediate portions 4, while inner edges of said intermediate portions are in contact with each other at the junction of the enclosing middle portion 3 and intermediate portions 4.

At the junction just referred to, stitches 6 pass through and unite the intermediate portions 4, so as to closely confine the body of packing in the enclosing middle portion 3. Stitches 7 pass through the outer edges of the intermediate portions 4 and also through the interposed marginal portions 5.

The several elements are thus combined with each other to closely confine the body of soft packing 2 which is protected by the enclosing middle portion 3 of a flexible, pliable strip, and the portions 4 and 5 are united to form a strong attaching flange D adapted to receive the attaching devices 1. This flange is reinforced by the interposed marginal portions 5, and a neat, smooth edge is formed by the folds at the junctions of members 4 and 5.

When the device is manufactured, the flange D is approximately radial to the body of packing 2, but owing to the flexibility of the strip of fabric, a hinge-like connection is formed at the stitches 6, so when the flange D is attached to a flat surface, it can lie tangential to the body of packing, as suggested by Fig. I.

I claim:

1. As a new article of manufacture, a gasket comprising an elongated body of yielding packing, a strip of flexible, pliable material having a tubular enclosing portion surrounding said packing and attaching portions extending from one side of said packing to form an attaching flange, stitches passing through and uniting said attaching portions at the junction of said tubular enclosing portion and the attaching portions so as to close said tubular portion and confine the packing therein, and stitches passing through and uniting said attaching portions at the outer edge of said attaching flange, one of said attaching portions having a marginal extension folded backwardly to form a folded outer edge for said attaching flange, and the last mentioned stitches being passed through said marginal extension.

2. As a new article of manufacture, a gasket comprising an elongated body of yielding packing, a strip of flexible, pliable material having a tubular middle portion surrounding said packing, two intermediate portions extending from one side of said packing to form an attaching flange, and marginal portions folded backwardly to provide four plies in said attaching flange, stitches passing through and uniting said intermediate portions at the junction of said tubular middle portion and the intermediate portions so as to close said tubular portion, and stitches passing through the outer edges of the two intermediate portions and also through the folded marginal portions.

3. As a new article of manufacture, a gasket comprising an elongated body of yielding fibrous packing substantially circular in cross-section, a strip of flexible, pliable material having a tubular middle portion surrounding said packing, intermediate portions extending from one side of said packing to form an attaching flange, and marginal portions folded backwardly and interposed between said intermediate portions to provide four plies in said flange and two folds at the edge of the flange, the interposed marginal portions being in contact with each other and also in contact with the inner faces of the intermediate portions, said intermediate portions being in contact with each other at the junction of the tubular middle portion and the intermediate portions, stitches passing through and uniting the intermediate portions at said junction so as to confine the packing in said tubular middle portion, and stitches passing through the outer edges of said intermediate portions and also through said interposed marginal portions.

In testimony that I claim the foregoing I hereunto affix my signature.

EDWARD J. WIRFS.